United States Patent [19]

Steckel

[11] Patent Number: 6,101,978
[45] Date of Patent: Aug. 15, 2000

[54] ANIMAL LITTER HAVING THE PROPERTY OF DETECTING URINARY INFECTION IN CATS

[75] Inventor: Ralph J. Steckel, Plano, Tex.

[73] Assignee: Pet Ecology Brands, Dallas, Tex.

[21] Appl. No.: 08/686,309

[22] Filed: Jul. 25, 1996

Related U.S. Application Data

[63] Continuation-in-part of application No. 08/678,240, Jul. 11, 1996, Pat. No. 5,655,480.
[51] Int. Cl.[7] ........................................... A01K 1/01
[52] U.S. Cl. .............................. 119/173; 119/171
[58] Field of Search ..................... 119/171, 172, 119/173

[56] References Cited

U.S. PATENT DOCUMENTS

| | | | |
|---|---|---|---|
| 5,143,023 | 9/1992 | Kuhns | 119/171 X |
| 5,267,532 | 12/1993 | Franklin et al. | 119/173 |
| 5,303,676 | 4/1994 | Lawson | 119/173 |
| 5,371,054 | 12/1994 | Pluta et al. | 119/173 X |

*Primary Examiner*—Peter M. Poon
*Assistant Examiner*—Yvonne R. Abbott
*Attorney, Agent, or Firm*—Gregory M. Howison

[57] ABSTRACT

An animal litter comprised of a liquid absorbent aggregate impregnated with a litmus agent for indicating a urinary tract infection in cats.

5 Claims, No Drawings

ANIMAL LITTER HAVING THE PROPERTY OF DETECTING URINARY INFECTION IN CATS

CROSS REFERENCE TO RELATED APPLICATION

This is a continuation-in-part of U.S. application Ser. No. 08/678,240 filed Jul. 11, 1996 for ANIMAL CONTROL LITTER now U.S. Pat. No. 5,655,480.

BACKGROUND OF THE INVENTION

1. Field of the Invention

This invention relates to an animal litter in which a liquid absorbent aggregate acts as a carrier of an agent for detecting urinary infection in cats.

2. Brief Description of Related Art

Because of the growing number of domestic animals, particularly cats, used as house pets, there is an increasing need for a simple means to inform the pet owner of the presence of urinary infections so that curative steps can be taken to avoid serious illness in the animal.

To the extent I am aware, the only procedure available today for detecting urinary infection in cats is to take the animal to a vet who makes an appropriate test. The test usually involves the taking of a urine sample and testing it for the presence of infection. Cats are not always cooperative in the sample gathering procedure and therefore there is a need for a simple technique for determining the presence of urinary infection that avoids the need for obtaining urine samples.

It is an object of the present invention to provide an animal litter that is impregnated with an agent for indicating the presence of infection.

It is another object of the present invention to provide an animal litter containing an agent sensitive to the alkalinity of cat urine to indicate a measure of urinary infection.

It is a farther object of the present invention to provide an animal litter that enables a pet owner to immediately determine the presence of a urinary infection without the need to take the animal to a vet.

SUMMARY OF THE INVENTION

According lo the present invention there is provided an animal litter comprised of a liquid absorbent aggregate that has been treated with an agent to visually indicate the presence of urinary infection in cats. The presence and the degree of infection is represented by the degree of alkalinity of the urine. Thus by impregnating the litter with a litmus-like material, such for example as phenolsgullonephthalein, a pet owner can, by observing the coloration of clumped litter containing the urine, immediately determine whether or not the pet has a urinary infection. If so, the pet may then be taken to a vet for treatment.

The litmus material is available from Merck under such names as Phenol Red, Sodium Golf or Reagent ACS Indicator.

The present invention is effective with all known animal litters, among them being various clays, such as those based upon clay minerals kaoline, illite, attapulgite and the like. The litmus material, available in granule form may be finely ground into a powder and well mixed with the liquid absorbent aggregate to coat the surfaces of the aggregate granules. Preferably the litmus granules are melted at temperatures about 212 Degees F to form a liquid which is sprayed upon the aggregate.

While the invention is effective with clay based litters, the preferred litter is that described and claimed in co-pending application Serial # (Attorneys docket P104-002) filed Jul. 11, 1996 for Animal Control Litter.

DESCRIPTION OF THE PREFERRED EMBODIMENT

The animal litter of the present invention is a composition comprised of a liquid absorbent aggregate impregnated with an agent for detecting urinary tract infection in cats. The agent is a litmus material which reacts to the alkalinity of the cat urine to change the color of the litter where the cat has voided to indicate to the pet owner the presence and degree of a urinary tract infection. The litmus material is a Phenolsgullonephthalein available from Merck under such names as Phenol Red, Sodium Golf or Reagent ACS Indicator.

The present invention is effective with all known animal litters, among them being various clays, such as those based upon clay minerals kaoline, illite, attapulgite and the like. The litmus agent or material, available in granular form may be finely ground into a powder and well mixed with the liquid absorbent aggregate to coat the surfaces of the aggregate granules. Preferably the litmus granules are melted at temperatures of about 212 degrees F. to form a liquid which is sprayed upon the aggregate to coat the surfaces of the granules.

The litmus coated granules react to the alkalinity of the cat urine change color to indicate the presence and the severity of a urinary tract infection. The color changes related to the PH of the urine is as follows:

Ph factor of 7.0, color is pink

Ph factor of 7.5, color is red

Ph factor of 8.0, color is blood red

All colors indicate the presence of a urinary tract infection. Should the blood red color be observed the pet owner should immediately take steps to cure the condition. In fact the presence of any of the colors should give rise to visit a vet for treatment to the animal.

While the invention is effective with clay based litters, the preferred litter is that described and claimed in co-pending application Serial # (Attorney Docket P104-002) filed Jul. 11, 1996 for Animal Control. The preferred litter incorporating features of the present invention comprises an expanded light weight aggregate, a clumping agent, a surfactant and an odor control agent. The composition is dust free, light weight and entirely organic. When the time comes a bio-clumped mass is scooped from the dry litter and flushed down the commode.

The light weight aggregate is selected from the class consisting of perlite, vermiculite, herculite, rice hulls and zeolite. Perlite is the preferred aggregate. It may initially be obtained from Harborlite Corporation, 1950 East "W" Ave, Vicksburg, Mich. 49097-0100 in grade (−6+16 millimeters). The perlite is then expanded to provide porous surfaces by heating the perlite to 1800 degrees F.

The clumping agent is a polymeric viscosity modifier available from Rhone-Poulenc, prospect Plains Road, Cranbury, N.J. 0851-7600 and sold under the trade name AgRho DR-2000. In order to enable the litter composition to agglomerate into a mass upon contact with animal urine the clumping agent is mixed with the litter composition, preferably in an amount ranging from about 1 percent to about 10 percent by weight of the litter composition.

The surfactant, preferably, is an alkylphenol ethoxylate sold under the trade name CHEMPRO S-100 by Chemorse, Ltd. of 4685 Merie Hay Road, Des Moines, Iowa 50322. The surfactant adds the property of anti-tracking to the composition thus preventing the carrying of portions of the composition from the litter box to other areas of the household.

The odor control agent is proprietary to the supplier who maintains it as a trade secret. It is available under the tradename D-ODOR from Enviro Chare America, Inc. P.O. Box 2226, Great Falls, Mont. 59403-2226. The agent is colorless and odor free. It performs the function of odor elimination, not as a coverup, such as a fragrance, which can be repulsive to cats, but prevents the formation of the ammoniacal odors.

A preferred formulation of the animal control litter of the present invention is as follows:

89.1 percent by weight of expanded aggregate
00.4 percent by weight of odor control agent
07.0 percent by weight of clumping agent
03.0 percent by weight of surfactant
00.5 percent by weight of phenolsgullonephthalein The composition is prepared by mixing the above components in the percentages given in apparatus which causes the odor control agent, the surfactant and the clumping agent to enter and to fill the pore in the expanded aggregate. The apparatus is a Continental Roto Mixer, Model V5, drum type roto. It rotates at 4 RPM. Every revolution provides 6 folds in the mixing action to assure that each particle of expanded aggregate is uniformly coated.

In the alternative a liquified litmus is sprayed upon the mixed components in lieu of using crushed litmus granules the resulting powder of which is mixed with the other components in the blender or mixer.

The composition is packaged or shipment in sealed bags which have been placed in cardboard shipping containers or pails so that the vibrations encountered in shipping do not cause the components to separate or to dry out any component.

Now that the invention has been described, modifications will occur to those skilled in the art and it is intended to cover such modifications which fall within the scope of the appended claims.

What is claimed is:

1. Animal litter comprised of a liquid absorbent aggregate impregnated with a litmus agent to indicate the presence of urinary tract infection in cats in which the component parts are present in the following amounts:

89.1 percent by weight of an expanded aggregate,
   00.4 percent by weight of an odor control agent,
   07.0 percent by weight of a clumping agent,
   03.0 percent by weight of a surfactant,
   00.5 percent by weight of a litmus agent.

2. The animal litter of claim 1 in which said aggregate is a clay mineral selected from the class consisting of kaoline, illite, and attapulgite.

3. The animal litter of claim 1 in which the aggregate is an expanded aggregate selected from the class consisting of perlite, vermiculite, herculite, rice hulls and zeolite.

4. The animal litter of claim 1 in which the litmus agent is a phenolsgullonephthalein.

5. The animal control litter of claim 1 in which the surfactant is an alkylphenol ethoxylate, the clumping agent is a polymeric viscosity modifier and the litmus material is a phenolsgullonephthalein.

* * * * *